Patented July 7, 1925.

1,545,005

UNITED STATES PATENT OFFICE.

THEODORE MEYER AND JOHN K. MONTGOMERY, OF PHILADELPHIA, PENNSYLVANIA; SAID MONTGOMERY ASSIGNOR TO SAID MEYER.

COMPOSITION OF MATTER AND METHOD OF MAKING THE SAME.

No Drawing.     Application filed June 7, 1924. Serial No. 718,551.

*To all whom it may concern:*

Be it known that we, THEODORE MEYER and JOHN K. MONTGOMERY, citizens of the United States, and residing at Philadelphia, in the county of Philadelphia and State of Pennsylvania, have invented certain new and useful Improvements in Composition of Matter and Methods of Making the Same, of which the following is a specification.

This invention relates to a composition of matter and the method of making the same, which has elastic adhesive properties, and which may be used as an adhesive and as a vermin-trap.

An object of the invention is to provide a composition that will serve as an elastic adhesive vermin-trap, such as will adhere to the feet of rats, mice, insects, etc.;

A further object is to provide a composition that will serve as a vehicle for substances that are poisonous to rodents, insects, etc.;

A further object is to provide a composition that may be used as a slow-drying, strong adhesive, that may for example, be used to increase the traction of a belt to a pulley;

Other objects will be apparent from the description.

The composition consists of an intimate mixture of resins, fatty acids and caoutchouc bodies, in colloidal condition, obtained by melting resinous gums, such as resins, rosin, gum thus, etc., with fatty acids, such as stearic acid, palmitic acid, etc., free from glycerides, and rubber or latex, or gutta percha, or similar caoutchouc bodies that are sticky when soft. The several substances may be melted separately, and added to each other; or they may be mechanically subdivided, and thoroughly mixed cold, and then melted; or one may be melted and the remaining materials, suitably subdivided, may be added and melted in contact with the one first melted. Other methods may be used to obtain a mixture of the melted materials. The resinous substance may be first melted, and to this may be added, preferably molten, the fatty acid, which should be free from glycerides, and the mixture well stirred; to this is added the caoutchouc body in a finely divided condition and the mass stirred until the caoutchouc body is melted and thoroughly distributed. The temperature at which the operation is conducted should not exceed 200 degrees Cent., and the entire operation of melting and stirring should not exceed two hours. The resulting mass is quickly cooled to ordinary temperature. The components are then in a colloidal state, and not in solution; if the temperature considerably exceeds that above given or the time of heating is prolonged appreciably, there will be a greater or less amount of solution of one or more of the components, with a reduction in efficiency.

The quantities of components used may be varied within reasonable limits, without materially changing the results; and for different uses, and for different climates, the percentages may be varied. For instance in summer or in warm climates, a harder or thicker product will be preferable to a soft product.

The following are proportions which have been found highly efficient:—

|  | Cold climate mixture. | Hot climate mixture. |
|---|---|---|
| Resinous gums | 62 to | 68 per cent. |
| Fatty acids | 34 to | 28 do. |
| Caoutchouc body | 4 to | 4 do. |
|  | 100 | 100 |

To the mass when molten, while stirring, may be added a substance which is poisonous to vermin; or a sweet smelling and tasting substance, or a coloring matter, or other ingredient that may add to its efficiency for any special use. At ordinary temperatures, the prepared mass is an intensely sticky and tenacious substance, and exhibits considerable strength and resilience when attempting to remove articles placed in contact with it.

The prepared mass may be applied to paper, as in sticky fly paper, or to boards, or, may be brushed or sprayed upon floors, sidewalks, etc., for use as a vermin-trap or vermicide; or may be kept in suitable cans, or other containers, for use when desired. If it is desired to apply it to the surface of a belt, to increase its traction on a pulley, the adhesive should be slightly warmed and applied in a thin layer with a brush, or may be sprayed in a suitable manner.

We claim:

1. The method of making an elastic adhesive, which comprises combining a resinous body with a substantially pure fatty acid and a rubber-like body, into a homogeneous mass.

2. The method of making an elastic adhesive, which comprises combining a resinous body with a substantially pure fatty acid and a rubber-like body into a homogeneous mass, and maintaining a part of the components in a colloidal condition.

3. The method of making an elastic adhesive, which comprises combining a resinous body with a substantially pure fatty acid free from a glyceride, and a rubber-like body into a homogeneous mass, and maintaining a part of the components in a colloidal condition.

4. The method of making an elastic adhesive, which comprises melting and mixing a resinous body, a substantially pure fatty acid, and a rubber-like body, into a homogeneous mass.

5. The method of making an elastic adhesive, which comprises melting and mixing below 200° C. a resinous body, a substantially pure fatty acid, and a rubber-like body, into a homogeneous mass.

6. The method of making an elastic adhesive, which comprises melting and mixing below 200° C. a resinous body, a substantially pure fatty acid free from a glyceride, and a rubber-like body, for a period not exceeding two hours, into a homogeneous mass.

7. A composition of matter consisting of an intimate fused mixture of a resinous gum, a substantially pure fatty acid, and a caoutchouc body, the mass containing the components in a colloidal state as distinguished from a dissolved state.

8. A composition of matter consisting of an intimate fused mixture containing a resinous gum, a substantially pure fatty acid, and a caoutchouc body, the mass containing its components in the colloidal state, and possessing the property of intense adhesiveness and tenacity.

9. An elastic adhesive containing a resinous body, a substantially pure fatty acid, and a rubber-like body, a part of said substances being in a colloidal condition, and thoroughly mixed.

10. An elastic adhesive containing a resinous body, a substantially pure fatty acid free from a glyceride, and a rubber-like body, a part of said substances being in a colloidal condition, and thoroughly mixed.

11. An elastic adhesive containing approximately 62 to 68 per cent of a resinous body, approximately 34 to 28 per cent of substantially pure fatty acid and approximately 4 per cent of a rubber-like body.

12. A vermicide or vermin-trap containing a resinous body, a substantially pure fatty acid, and a rubber-like body, compounded into a homogeneous mass, a part of said components being in a colloidal condition.

13. A vermicide or vermin-trap containing 62 to 68 parts of a resinous body, 34 to 28 parts of a substantially pure fatty acid free from a glyceride, and four parts of a rubber-like body, compounded into a homogeneous mass, a part of said components being in a colloidal condition.

In testimony whereof we hereby affix our signatures.

THEODORE MEYER.
JOHN K. MONTGOMERY.